US005626662A

United States Patent [19]

Urban

[11] Patent Number: 5,626,662

[45] Date of Patent: May 6, 1997

[54] FINE DIVISION IN THE PREPARATION OF ORGANIC PIGMENTS

[75] Inventor: Manfred Urban, Wiesbaden, Germany

[73] Assignee: Hoechst Aktiengesellschaft, Germany

[21] Appl. No.: 421,196

[22] Filed: Apr. 13, 1995

[30] Foreign Application Priority Data

May 21, 1994 [DE] Germany .................. 44 13 849.0

[51] Int. Cl.$^6$ ............... C09B 48/00; C09B 3/14
[52] U.S. Cl. ............ 106/497; 106/493; 106/494; 106/495; 106/498; 106/31.28; 106/31.47; 106/31.51; 523/160; 523/461
[58] Field of Search .................. 106/497, 498, 106/495, 494, 493, 23 D, 23 K, 22 D, 22 K

[56] References Cited

U.S. PATENT DOCUMENTS

| | | | |
|---|---|---|---|
| 2,905,685 | 9/1959 | Eckert et al. | 546/37 |
| 2,969,366 | 1/1961 | Griswold et al. | 546/49 |
| 3,332,931 | 7/1967 | Braun et al. | 534/591 |
| 3,793,327 | 2/1974 | Jeffe | 546/56 |
| 4,262,851 | 4/1981 | Graser et al. | 241/16 |
| 4,439,240 | 3/1984 | Ganci | 106/495 |
| 4,455,173 | 6/1984 | Jaffe | 106/495 |
| 4,478,968 | 10/1984 | Jaffe | 106/413 |
| 4,548,968 | 10/1985 | Jaffe | 524/88 |
| 4,742,170 | 5/1988 | Spietschka et al. | 546/37 |
| 5,062,577 | 11/1991 | Schmitt et al. | 241/171 |
| 5,074,918 | 12/1991 | Babler | 106/493 |
| 5,296,033 | 3/1994 | Dietz et al. | 106/412 |
| 5,296,034 | 3/1994 | Dietz et al. | 106/412 |
| 5,318,627 | 6/1994 | Dietz et al. | 106/498 |

FOREIGN PATENT DOCUMENTS

| | | |
|---|---|---|
| 0069394 | 1/1983 | European Pat. Off. . |
| 0072520 | 2/1983 | European Pat. Off. . |
| 0069396 | 3/1986 | European Pat. Off. . |
| 0408499 | 1/1991 | European Pat. Off. . |
| 0176899 | 4/1991 | European Pat. Off. . |
| 0504923 | 9/1992 | European Pat. Off. . |
| 0574792 | 12/1993 | European Pat. Off. . |
| 0574790 | 12/1993 | European Pat. Off. . |
| 1067157 | 4/1960 | Germany . |
| 1113773 | 9/1961 | Germany . |
| 1225598 | 9/1966 | Germany . |
| 1230946 | 7/1967 | Germany . |
| 1914208 | 11/1970 | Germany . |
| 2049225 | 4/1972 | Germany . |
| 2832761 | 10/1979 | Germany . |
| 3716587 | 4/1988 | Germany . |
| 1293042 | 10/1972 | United Kingdom . |
| 2211509 | 7/1989 | United Kingdom . |

OTHER PUBLICATIONS

Perry's Chemical Engineers' Handbook, 6th ed., McGraw–Hill, New York, 1984, pp. 8–32 through 3–35. TP151. p. 45 Dec. 1984.

Derwent Abstract An 72/25889T/17 of DE 2049225–A Apr. 1972.

Primary Examiner—Mark L. Bell
Assistant Examiner—Scott L. Hertzog
Attorney, Agent, or Firm—Connolly & Hutz

[57] ABSTRACT

Organic polycyclic crude pigments are finely divided in an ecologically and economically advantageous manner by first of all subjecting crude, coarsely crystalline pigments to dry milling and wet-milling the resulting finely divided prepigments in aqueous suspension in a stirred ball mill which is operated at a power density of more than 2.5 kW per liter of milling space and a peripheral stirrer speed of more than 12 m/s under the action of grinding media having a diameter of less than or equal to 1 mm. Pigments prepared in this way are particularly suitable as colorants for the pigmentation of paints, printing inks and plastics.

18 Claims, No Drawings

FINE DIVISION IN THE PREPARATION OF ORGANIC PIGMENTS

The present invention relates to an environmentally friendly and economical process for the fine division of organic pigments.

A precondition for the industrial use of organic pigments is their optimum dispersion in the corresponding application media. The pigments must be readily dispersible and must give colorations of high color strength. This requirement becomes more difficult to meet the more transparent the pigment. It is particularly difficult to prepare pigments which are readily dispersible in plastics. Dispersion is made easier if compatibility between the plastic and the additives which are applied to the pigments in the course of fine division or dispersion is good.

When organic pigments are prepared, depending on the synthesis route, they are obtained in coarsely crystalline or finely divided form. The crude pigments which are obtained during synthesis in coarsely crystalline form must be finely divided before use. Examples of fine-division processes of this kind involve milling on rolling or vibrating mills, which can be carried out wet or dry, kneading, revatting and reprecipitation from sulfuric acid or polyphosphoric acid. Combinations of these methods are also described. The most important method industrially is dry salt grinding.

In order to achieve optimum applicability, the prepigments which are present following the fine division are converted into the pigment form by means of additional treatment methods, for example after treatment with water, solvents or dilute acids and alkalis. These methods are referred to in general as finishing. It is also possible to improve applicability by mechanical treatment.

The hitherto conventional conversion of the crude, coarsely crystalline pigments to the pigment form is described in the dry- and wet-milling processes indicated below.

U.S. Pat. No. 5,074,918 describes a process for the conditioning of organic pigments by dry milling of the crude, coarsely crystalline pigments with salt or wet milling of the crude, coarsely crystalline pigments without salt, in each case in the presence of micronized waxes. In the case of dry milling with salt, large quantities of salt are obtained in the waste water, making this procedure expensive and ecologically objectionable. Under the stated conditions of the wet milling operation, however, it is not possible to prepare transparent pigments of high color strength for the plastics sector from crude, highly crystalline pigments.

U.S. Pat. No. 4,455,173 describes the preparation of pigment formulations based on quinacridone pigments by dry milling of crude, coarsely crystalline pigments followed by wet milling of the resulting millbases in acetone. The large quantities of solvent, especially acetone, which require reprocessing render the process uneconomical. Owing to the low boiling point of the solvent used, complex apparatus is required for regeneration.

U.S. Pat. No. 4 548 968 describes the preparation of resin-modified quinacridone pigments by dry milling of the crude, coarsely crystalline pigments with the addition of resins and small quantities of inorganic salts, followed by wet milling of the millbases in an aqueous-alkaline medium. In this process, salts and alkalis are obtained in the waste water and require reprocessing.

U.S. Pat. No. 4,742,170 describes the dry milling of crude, coarsely crystalline pigments in the presence of inorganic salts which are added as milling auxiliaries. After the milling operation the salts are removed by aqueous extraction. The large quantities of dilute, salt containing waste waters which are produced in this process, and which require reprocessing, render the process uneconomical.

GB-A-1 293 042 describes a process for the preparation of highly transparent perylene pigments by salt grinding of the crude pigments in the presence of fatty alcohols which remain in the pigment after the extraction of the salt. This process is also uneconomical, for the reasons mentioned above.

CA-A-2 070 433 describes a wet-milling process for the preparation of pigment formulations based on C.I. Pigment Violet 23. Milling is followed by a solvent finish, in which large quantities of organic solvents are employed which have to be regenerated in complex apparatus. For this reason this process is expensive.

The use of waxes in order to enhance the performance properties in plastics is described in DE-A-2 049 225. The preparation of readily dispersible pigments for use in thermoplastics is carried out by mixing the pigments with wax dispersions in mixer or edge runner mills.

U.S. Pat. No. 5,296,034 describes a process for the preparation of copper phthalocyanine pigment formulations of the α-phase, which are prepared from crude copper phthalocyanine pigments of the β-phase by phase conversion by dispensing with a dry milling step but carrying out wet milling of the abovementioned β-modification. A similar process is described in U.S. Pat. No. 5,296,033, but in this case is carried out under conditions of phase retention. However, both of the processes mentioned result in phthalocyanine pigments whose color strength and dispersibility in plastics still leave something to be desired.

No processes have hitherto been disclosed by which transparent organic pigments of high color strength and outstanding dispersibility, for use in plastics, can be prepared in an environment-friendly manner, without the production of polluted waste waters and without the use of complex finishing apparatus for the treatment and regeneration of solvent.

The object of the present invention was to provide a process for the fine division of polycyclic organic crude pigments which avoids, in particular, the ecological and economic disadvantages of previously disclosed fine-division processes for organic crude pigments and leads to good performance properties of these organic pigments, especially in plastics.

It has surprisingly been found that readily dispersible organic pigments of high color strength can be prepared in an economical and environment-friendly manner by dry milling of the crude pigments which are obtained in the synthesis or in the purification in coarsely crystalline form, if desired in the presence, of milling auxiliaries, and by subjecting the resulting finely divided, usually highly agglomerated prepigments to aqueous wet milling and then isolating them.

The present invention provides a process for the fine division of crude polycyclic organic pigments, which comprises first of all subjecting the crude, coarsely crystalline pigments to dry milling and wet-milling the resulting finely divided prepigments in aqueous suspension in a stirred ball mill which is operated at a power density of more than 2.5 kW per liter of milling space and a peripheral stirrer speed of more than 12 m/s under the action of grinding media having a diameter of less than or equal to 1 mm.

All those polycyclic organic crude pigments which are obtained in the synthesis in coarsely crystalline form are suitable for the process according to the invention, examples being the crude pigments from the series of the dioxazines, perylenes and quinacridones. It is also possible to employ mixtures of these crude pigments and mixed-crystal crude pigments based on these crude pigments. Examples of the abovementioned crude pigments are carbazole violet (Pigment Violet 23 ), perylenetetracarboxylic acid diimide (Pigment Brown 26), perylenetetracarboxylic dianhydride (Pigment Red 224), perylenetetracarboxylic acid bis-4'-ethoxyphenylimide (Pigment Red 123), perylenetetracarboxylic acid his-3',5'-dimethylphenylimide (Pigment Red 149), perylenetetracarboxylic acid bis-4'-phenylazophenylimide (Pigment Red 178), perylenetetracarboxylic acid bis-4'-chlorophenylimide (Pigment Red 32), unsubstituted quinacridones (Pigment Violet 19, β- and γ-phase), 2,9-dimethylquinacridone (Pigment Red 122 ), 2,9-dichloroquinacridone (Pigment Red 202), 4,11-dichloroquinacridone, 1,8-dichloroquinacridone and 1,10-dichloroquinacridone.

In a preferred embodiment of the process according to the invention, dry milling is preceded by the addition of at least one of the additives mentioned below as milling auxiliary, preferably a surface-active agent and/or wax.

Suitable surface-active agents are anionic, cationic and nonionic surfactants.

Suitable anionic surface-active agents are fatty acid taurides, fatty acid N-methyltaurides, fatty acid isethionates, alkylbenzenesulfonates, alkylnaphthalenesulfonates, alkylphenol polyglycol ether sulfates and fatty alcohol polyglycol ether sulfates, fatty acids, for example palmitic, stearic and oleic acid, soaps, for example alkali metal salts of fatty acids, naphthenic acids and resin acids, for example abietic acid, and alkali-soluble resins, for example rosin-modified maleic resins.

Suitable cationic surface-active agents are quaternary ammonium salts, fatty amine ethoxylates, fatty aminopolyglycol ethers and fatty amines.

Suitable nonionic surface-active agents are fatty alcohol polyglycol ethers, fatty acid polyglycol esters and alkylphenol polyglycol ethers.

Examples which may be mentioned from the wide variety of waxes are acid waxes, ester waxes, amide waxes, hydrocarbon waxes and polyolefin waxes.

Particular preference is given to nonionic surface-active agents and to polyolefin waxes. Mixtures of the additives mentioned may also be employed. The additives may remain in the pigment after the milling operation. The additives can be added all at once or in a number of portions. The quantity of the additives employed is advantageously from 0.1 to 10% by weight, preferably from 2.5 to 7.5% by weight, based on the crude pigment employed.

Dry milling is carried out in a discontinuous or continuous vibrating or rolling mill under mild milling conditions which are defined below and preferably with a low millbase charge. The millbase charge is defined as the ratio of the quantity of millbase (crude pigment and, if desired, additive) to the free volume of the bed of grinding media (only the grinding media). The millbase charge is normally less than 250 g of millbase per liter of free volume of the bed of grinding media, preferably at from 50 to 150 g/l. The millbase charge may be even higher, although in this case technical problems may occur and in many cases the coloring objective is not attained.

When milling is carried out in a vibrating mill, the grinding media essentially perform only rotating movements and their kinetic energy is kept as low as possible by the choice of mass and size and by the frequency and amplitude. Moreover, the mill is operated with a high proportion of grinding media. The grinding charge, defined as the ratio of the volume of the bed of grinding media to the volume of the mill, is more than 60% by volume.

Milling in a rolling mill is carried out at a grinding charge of from 40 to 60% by volume and at from 65 to 75% of the critical frequency. The kinetic energy is kept as low as possible by the choice of the mass and size of the grinding media. Here too the mill is preferably operated with a low millbase charge.

The grinding media used are balls or cylinders of steel, corundum, porcelain, steatite, aluminum oxide, mixed oxides and quartz with a diameter of from 3 to 20 mm. These grinding media preferably have a smooth, pore-free surface. The milling temperature is generally below 100° C. The duration of milling depends on how fine the pigment is required to be. The residence time of the millbase in the vibrating mill, depending on the degree of fineness required, is generally between 1 and 25 hours. A duration of from 1 to 15 hours, preferably from 2 to 8 hours, is found to be expedient. The residence time of the millbase in the rolling mill, depending on the degree of fineness required, is generally between 5 and 100 hours. A duration of from 10 to 30 hours, preferably from 15 to 25 hours, is found to be expedient.

In addition to the components mentioned above, the millbase may also comprise other conventional additives, for example small quantities (up to 5% by weight) of water, pigment-based pigment-dispersing agents, resins, salts of resins and extenders. The additives may also be employed in emulsified, suspended and liquid form, since pulverulent substances may absorb small quantities (up to about 5% by weight) of liquid without immediately losing their property as a pulverulent substance. To reduce the risk of a dust explosion it is impossible to add small quantities of inorganic salts. It is particularly advantageous to use additives which can remain in the pigment after the milling operation. The salts of the fatty acids and resins can be converted following the milling operation into the free acids or resins.

The additives can be added before, during or after dry milling, or else during or after wet milling, during or after isolation, and in the latter case also by dry mixing. The most suitable point in time must be determined beforehand by guideline experiments.

Since in the case of dry milling, even in the presence of milling auxiliaries, the desired comminution of the crude, coarsely crystalline pigment particles is accompanied by agglomeration processes, the dry milling is followed by wet milling in order to disperse the agglomerated millbase.

Suitable mills for the wet milling are all discontinuous and continuous stirred ball mills. A high milling action is necessary in this context. This is achieved by the use of a specific embodiment of the stirred ball mill. Particularly suitable stirred ball mills for milling to the desired efficiency are those which are designed for batchwise and continuous operation, contain a cylindrical or hollow-cylindrical milling chamber in horizontal or vertical construction, which can be operated at a specific power density of more than 2.5 kW per liter of milling space and whose peripheral stirrer speed is more than 12 m/s.

Examples of such mills are described in U.S. Pat. No. 5,062,577. The energy output by the stirrer mechanism per unit time is transmitted to the millbase as comminution energy and as frictional energy in the form of heat. In order reliably to dissipate this large quantity of heat it is necessary to take constructive measures in order to keep the ratio of milling space to milling-chamber surface area (cooling area) as low as possible. When milling is carried out in circulation at high throughputs the heat can be dissipated to the outside predominantly via the millbase. Examples of the grinding media used are balls of zirconium oxide, zirconium mixed oxide, aluminum oxide or quartz with a diameter of less than 1 mm; it is advantageous to use grinding media having a diameter of from 0.2 to 0.8 mm, preferably from 0.3 to 0.5 mm.

When continuous stirred ball mills are used for the dispersion, the grinding media are separated from the millbase preferably by centrifugation, so that there is virtually no contact between the separation devices and the grinding media, thus making it possible to a large extent to prevent blockages in the separation devices. In this case the stirred ball mills are operated with a high grinding charge. In the case of the continuous stirred ball mills the milling space is filled almost completely with grinding media.

Determination of the appropriate milling conditions necessitates preliminary experiments. Milling is carried out in an aqueous medium, preferably within the neutral pH range (pH 6 to 8).

The pigment concentration in the millbase of the wet-milling stage is dependent on the rheology of the suspension and is advantageously not more than 40% by weight, preferably from 5 to 35% by weight, in particular from 10 to 20% by weight, of the millbase suspension.

Wet milling is carried out at temperatures in the range from 0° to 100° C., advantageously at a temperature of between 10° and 60° C. and preferably at from 20° to 50° C. The duration of wet milling depends on the required fineness of the pigment. The residence time of the millbase in the stirred ball mill, in dependence on the degree of fineness required, is in general between 5 and 60 minutes. A duration of from 5 to 45 minutes, preferably from 10 to 30 minutes, is found to be expedient.

The finely divided pigments which are present after wet milling are isolated. The term isolation refers to the filtering and washing of the filter-cake and the subsequent drying of the pigment. By means of the choice of additive, the concentrations thereof and the selection of the milling conditions it is possible, depending on the desired application, to prepare pigments having either a relatively high transparency or an improved hiding power. The pigments prepared in this way are suitable for the pigmentation of plastics, paints and printing inks.

The preparation of pigments by the process according to the invention has proven particularly economical and environment-friendly because the fine division of the crude pigments by salt-free dry grinding followed by aqueous wet milling does not result in the waste waters being contaminated by salts. Since milling is carried out only in water and a subsequent solvent finish is unnecessary, no complex apparatus is required for the treatment and regeneration of solvent.

The pigments which are obtainable in accordance with the present invention are distinguished by their outstanding coloring properties, especially the dispersibility, transparency, color strength and cleanness of color. The pigments prepared in accordance with the invention can be employed for pigmenting high molecular weight organic materials of natural or synthetic origin and can be dispersed readily up to high degrees of fineness; examples of high molecular weight organic materials which can be pigmented using the stated pigments are cellulose ethers and cellulose esters, such as ethyl cellulose, nitrocellulose, cellulose acetate or cellulose butyrate, natural resins or synthetic resins, such as addition polymerization resins or condensation resins, for example amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures.

In this context it is irrelevant whether the high molecular weight organic compounds mentioned are in the form of plastic masses, melts, spinning solutions, paints, coating materials or printing inks. Depending on the intended application it proves advantageous to use the pigment formulations obtained in accordance with the invention as toners or in the form of preparations or dispersions. Based on the high molecular weight organic material to be pigmented, the pigment formulations prepared in accordance with the invention are employed in a quantity of from 0.1 to 10% by weight.

To evaluate the properties in the plastics sector of the pigments prepared according to the present invention, a selection was made from the large number of known plastics of plasticized polyvinyl chloride (PVC) and low-pressure polyethylene (PE). Heat resistance was determined in accordance with DIN 53772-A. Bleed fastness was determined in accordance win DIN 53775.

To evaluate the properties in the paint sector of the pigments prepared according to the invention, a selection was made from the large number of known lacquers of an alkyd-melamine resin lacquer (AM) containing aromatic components and based on a medium-oil nondrying alkyd resin composed of synthetic fatty acids and phthalic anhydride and of a butanol-etherified melamine resin and proportions of a nondrying alkyd resin based on ricinoleic acid (short-oil), and of a high-solids acrylic resin stoving enamel based on a nonaqueous dispersion (HSS).

The color strength and color were determined in accordance with DIN 55986. The rheology of the millbase after dispersion (millbase rheology) was evaluated by means of the following five-step scale:

5 highly fluid 4 liquid 3 viscous 2 slightly set 1 set

After dilution of the millbase to the final pigment concentration, the viscosity was evaluated using the Rossmann Viscospatula, type 301 from Erichsen, Iserlohn. Gloss measurements were carried out on cast films at an angle of 20° in accordance with DEN 67 530 (ASTM D 523) using the "multigloss" glossimeter from Byk-Mallinckrodt, Wesel.

The crystal phase of the crude pigments, prepigments, pigments, mixed-crystal pigments and pigment formulations was determined by X-ray spectroscopy. The X-ray spectra were recorded with CuKα radiation. In the examples which follow, parts and percentages are based in each case on the weight of the substances described.

EXAMPLE 1

30 parts of crude, coarsely crystalline pigment (C.I. Pigment Violet 19, C.I. No. 46500, β-phase, prepared according to U.S. Pat. No. 2,969,366) and 1.5 parts of polyolefin wax (m.p.: 104° C., molecular mass about 2000) are placed in a plastic container which is filled to 80% of its volume with 1400 parts of steatite cylinders having a diameter of 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 mm. The millbase is then screened to remove the grinding media.

A suspension consisting of 90 parts of water and 10 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction and the solid product is washed with water and dried at 80° C. 9.8 parts are obtained of a pigment (β-phase with traces of α-phase) which is very readily dispersible in the plastic (PVC) and gives transparent colorations of high color strength with unblemished bleed fastness.

EXAMPLE 2

30 parts of crude, coarsely crystalline pigment (C.I. Pigment Violet 19, C.I. No. 46500, β-phase, prepared according to U.S. Pat No. 2,969,366) and 1.5 parts of surface-active agent (fatty acid polyglycol ester based on oleic acid, esterified with 6 mol of ethylene oxide) are placed in a plastic container which is filled to 80% of its volume with 1400 parts of steatite cylinders having a diameter of 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 mm. The millbase is then screened to remove the grinding media.

A suspension consisting of 90 parts of water and 10 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction and the solid product is washed with water and dried at 80° C. 9.8 parts are obtained of a pigment (β-phase with traces of α-phase) which is very readily dispersible in the plastic (PVC) and gives transparent colorations of high color strength with unblemished bleed fastness.

EXAMPLE 3

30 parts of crude, coarsely crystalline pigment (C.I. Pigment Violet 19, C.I. No. 46500, β-phase, prepared according to U.S. Pat No. 2,969,366), 1.5 parts of polyolefin wax (m.p.: 104° C., molecular mass about 2000) and 1.5 parts of surface-active agent (fatty acid polyglycol ester based on oleic acid, esterified with 6 mol of ethylene oxide) are placed in a plastic container which is filled to 80% of its volume with 1400 parts of steatite cylinders having a diameter of 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 mm. The millbase is then screened to remove the grinding media.

A suspension consisting of 90 parts of water and 10 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4mm as grinding media, and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction and the solid product is washed with water and dried at 80° C. 9.2 parts are obtained of a pigment (β-phase with traces of α-phase) which is very readily dispersible in the plastic (PVC) and gives transparent colorations of high color strength with unblemished bleed fastness.

EXAMPLE 4

30 parts of crude, coarsely crystalline pigment (C.I. Pigment Violet 19, C.I. No. 46500, β-phase, prepared according to U.S. Pat No. 2,969,366) and 1.5 parts of polyolefin wax (m.p.: 104° C., molecular mass about 2000) are placed in a plastic container which is filled to 55% of its volume with 2300 parts of steel balls having a diameter of 10 mm as grinding media. Milling is carried out for 24 hours at 75% of the critical frequency on a roller table. The millbase is then screened to remove the grinding media.

A suspension consisting of 90 parts of water and 10 parts of the prepigment obtained from the rolling milling is metered into a stirred ball mill (manufactured by Draiswerke GmbH, Mannheim) which is filled with 514 parts of zirconium oxide beads having a diameter of from 0.4 to 0.6 mm as grinding media, and the charge is milled at a peripheral stirrer speed of 15.6 m/s and a specific power density of 3.1 kW per liter of milling space at 25° C. for 15 minutes. The millbase suspension is then screened to remove the grinding media, which are washed with water, the combined millbase suspensions are filtered with suction and the solid product is washed with water and dried at 80° C. 9.8 parts are obtained of a pigment (β-phase with traces of α-phase) which is very readily dispersible in the plastic (PVC) and gives transparent colorations of high color strength with unblemished bleed fastness.

EXAMPLE 5

30 parts of crude, coarsely crystalline pigment (C.I. Pigment Violet 19, C.I. No. 46500, γ-phase, prepared according to U.S. Pat No. 2,969,366) and 1.5 parts of polyolefin wax (m.p.: 104° C., molecular mass about 2000) are placed in a plastic container which is filled to 80% of its volume with 1400 parts of steatite cylinders having a diameter of 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 mm. The millbase is then screened to remove the grinding media.

A suspension consisting of 90 parts of water and 10 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 15 minutes. The millbase suspension is then screened to remove the grinding media, which are washed with water, the combined millbase suspensions are filtered with suction and the solid product is washed with water and dried at 80° C. 9.8 parts are obtained of a pigment (γ-phase, with traces of α-phase) which gives transparent coatings of high color strength in the AM lacquer.

EXAMPLE 6

30 parts of crude, coarsely crystalline pigment (C.I. Pigment Red 122, C.I. No. 71145, prepared according to U.S. Pat No. 3,793,327) and 1.5 part of polyolefin wax (m.p.: 104° C., molecular mass about 2000) are placed in a plastic container which is filled to 80% of its volume with 1400 parts of steatite cylinders having a diameter of 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 min. The millbase is then screened to remove the grinding media.

A suspension consisting of 90 parts of water and 10 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 1.5.6 m/s and a specific power density of 3.1 kW per liter of milling space at 25° C. for 10 minutes. The millbase suspension is then screened to remove the grinding media, which are washed with water, the combined millbase: suspensions are filtered with suction and the solid product is washed with water and dried at 80° C. 9.9 parts are obtained of a pigment which is very readily dispersible in the plastic (PVC) and gives colorations of high color strength with unblemished bleed fastness.

EXAMPLE 7

30 parts of crude, coarsely crystalline mixed-crystal pigment (consisting of 80% C.I. Pigment Red 122 and 20% C.I. Pigment Violet 19, prepared according to U.S. Pat No. 3,793,327) and 1.5 parts of polyolefin wax (m.p.: 104° C., molecular mass about 2000) are placed in a plastic container which is filled to 80% of its volume with 1400 parts of steatite cylinders having a diameter of 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 mm. The millbase is then screened to remove the grinding media.

A suspension consisting of 90 parts of water and 10 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction and the solid product is washed with water and dried at 80° C. 10.0 parts are obtained of a mixed-crystal pigment which is very readily dispersible in the plastic (PVC) and gives colorations of high color strength with unblemished bleed fastness.

EXAMPLE 8

30 parts of crude, coarsely crystalline perylene pigment (C.I. Pigment Red 149, C.I. No. 71137, prepared according to U.S. Pat. No. 2,905,685 and 1.5 parts of polyolefin wax (m.p.: 104° C., molecular mass about 2000) are placed in a steel container which is filled to 80% of its volume with 1400 parts of steatite balls having a diameter of 12 mm as grinding media, and milling is carried out for 8 hours on a vibrating mill (Vibratom model, manufacturer: Siebtechnik, Mühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction and the solid product is washed with water and dried at 80° C. 14.4 parts are obtained of a pigment which is very readily dispersible in the plastic (PVC) and gives transparent colorations of high color strength with unblemished bleed fastness.

EXAMPLE 8a (comparison example)

30 parts of crude, coarsely crystalline perylene pigment (C.I. Pigment Red 149, C.I. No. 712137, prepared according to U.S. Pat. No. 2,905,685 and 1.5 parts of polyolefin wax (m.p.: 104° C., molecular mass about 2000) are placed in a steel container which is filled to 80% of its volume with 1400 parts of steatite balls having a diameter of 12 mm as grinding media, and milling is car:tied out for 8 hours on a vibrating mill (Vibratom model, manufacturer: Siebtechnik, Mühlheim) at 1400 revolutions per minute with a vibration circle of 4 mm. The millbase is then screened to remove the grinding media. 14.9 parts are obtained of a pigment which in the plastic (PVC) gives colorations of higher hiding power and lower color strength than the pigment prepared in accordance with Example 8.

EXAMPLE 8b (comparison example)

A suspension consisting of 85 parts of water and 15 parts of crude, coarsely crystalline perylene pigment (C.I. Pigment Red 149, C.I. No. 71137, prepared according to U.S. Pat. No. 2,905,685 and 1.5 parts of polyolefin wax (m.p.: 104° C., molecular mass about 2000) is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction and the solid product is washed with water and dried at 80° C. 14.5 parts are obtained of a pigment which in the plastic (PVC) gives colorations of higher hiding power and lower color strength than the pigment prepared in accordance with Example 8.

EXAMPLE 8c (comparison example)

30 parts of crude, coarsely crystalline perylene pigment (C.I. Pigment Red 149, C.I. No. 71137, prepared according to U.S. Pat. No. 2,905,685 and 1.5 parts of polyolefin wax (m.p.: 104° C., molecular mass about 2000) are placed in a steel container which is filled to 80% Of its volume with 1400 parts of steatite balls having a diameter of 12 mm as grinding media, and milling is carried out for 8 hours on a vibrating mill (Vibratom model, manufacturer: Siebtechnik, Mühlheim) at 1400 revolutions per minute with a vibration circle of 4 mm. The millbase is then screened to remove the grinding media. This milling is repeated once.

A suspension consisting of 297.5 parts of water and 52.5 parts of the prepigment obtained from the vibration milling are metered into a stirred ball mill with disc stirrer mechanism (manufactured by Draiswerke GmbH, Mannheim) which is filled with 1000 parts of quartz beads having a diameter of 1 mm as grinding media, and the charge is milled at a peripheral stirrer speed of 10.2 m/s and a specific power density of 0.45 kW per liter of milling space at 25° C. for 1 hour. The millbase suspension is then screened to remove the grinding media, which are washed with water, the combined millbase suspensions are filtered with suction, and the solid product is washed with water and dried at 80° C. 51.8 parts are obtained of a pigment which is very readily dispersible in the plastic (PVC) and gives colorations of distinctly higher hiding power than the pigment prepared in accordance with Example 8. It was not possible to obtain transparent colorations.

EXAMPLE 9

30 parts of crude, coarsely crystalline perylene pigment (C.I. Pigment Red 178, C.I. No. 71155, prepared according to U.S. Pat. No. 3,332,931 and 1.5 parts of polyolefin wax (m.p.: 104° C., molecular mass about 2000) are placed in a steel container which is filled to 80% of its volume with 1400 parts of steatite balls having a diameter of 12 mm as grinding media, and milling is carried out for 8 hours on a vibrating mill (Vibratom model, manufacturer: Siebtechnik, Mühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction and the solid product is washed with water and dried at 80° C. 14.2 parts are obtained of a pigment which is very readily dispersible in the plastic (PVC) and gives colorations of high color strength with unblemished bleed fastness.

EXAMPLE 10

30 parts of crude, coarsely crystalline perylene pigment (C.I. Pigment Red 123, C.I. No. 71145, prepared according to DE-A-1 113 773) and 1.5 parts of polyolefin wax (m.p.: 104° C., molecular mass about 2000) are placed in a steel container which is filled to 80% of its volume with 1400 parts of steatite balls having a diameter of 12 mm as grinding media, and milling is carried out for 8 hours on a vibrating mill (Vibratom model, manufacturer: Siebtechnik, Mühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction and the solid product is washed with water and dried at 80° C. 13.8 parts are obtained of a pigment which is very readily dispersible in the plastic (PVC) and gives transparent colorations of high color strength with unblemished bleed fastness.

EXAMPLE 11

30 parts of crude, coarsely crystalline perylene mixed-crystal pigment (consisting of 90 mol % of perylenetetracarboxylic acid bis-3',5'-dimethylphenylimide, C.I. Pigment Red 149 and 10 mol % of perylenetetracarboxylic acid mono-3',5'-dimethylphenylimide-mono-4'-ethoxyphenylimide, prepared according to DE-A 3 436 208) and 1.5 parts of polyolefin wax (m.p.: 104° C., molecular mass about 2000) are placed in a steel container which is filled to 80% of its volume with 1400 parts of steatite balls having a diameter of 12 mm as grinding media, and milling is carried out for 8 hours on a vibrating mill (Vibratom model, manufacturer: Siebtechnik Mühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 16.5 m/s and a specific power density of 3.1 kW per liter of milling space at 25° C. for 30 minutes. The millbase suspension is then screened to remove the grinding media, which are washed with water, the combined millbase suspensions are filtered with suction and the solid product is washed with water and dried at 80° C. 14.2 parts are obtained of a mixed-crystal pigment which is very readily dispersible in the plastic (PVC) and gives transparent colorations of high color strength with unblemished bleed fastness. The temperature resistance in polyolefin (PE) is 300

EXAMPLE 12

30 parts of crude, coarsely crystalline perylene pigment (C.I. Pigment Red 149, C.I. No. 71137, prepared according to U.S. Pat. No. 2,905,685) and 0.75 part of polyolefin wax (m.p.: 104° C., molecular mass about 2000) are placed in a steel container which is filled to 80% of its volume with 1400 parts of steatite balls having a diameter of 12 mm as grinding media, and milling is carried out for 8 hours on a vibrating mill (Vibratom model, manufacturer: Siebtechnik, Mühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction and the solid product is washed with water and dried at 80° C. 14.6 parts are obtained of a pigment which is very readily dispersible in the plastic (PVC) and gives transparent colorations of high color strength with unblemished bleed fastness.

EXAMPLE 13

30 parts of crude, coarsely crystalline perylene pigment (C.I. Pigment Red 149, C.I. No. 71137, prepared according to U.S. Pat No. 2,905,685 and 1.5 parts of polyolefin wax (m.p.: 104° C., molecular mass about 2000) are placed in a steel container which is filled to 80% of its volume with 1400 parts of steatite balls having a diameter of 12 mm as grinding media, and milling is carried out for 8 hours on a vibrating mill (Vibratom model, manufacturer: Siebtechnik, Mühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4mm as grinding media, and the charge is milled at a peripheral stirrer speed of 15.6 m/s and a specific power density of 3.1 kW per liter of milling space at 25° C. for 15 minutes. The millbase suspension is then screened to remove the grinding media, which are washed with water, and the millbase suspensions are combined. 904 parts of millbase suspension are obtained. This suspension is acidified with 0.9 part of sulfuric acid (96% strength), heated to 80° C. and stirred at this temperature for 3 hours. The solid product is then filtered off with suction, washed neutral with water and dried at 80° C. 14.4 parts are obtained of a pigment which is very readily dispersible in the plastic (PVC+PE) and gives transparent colorations of high color strength with unblemished bleed fastness. The weather fastness is very good and the temperature resistance is <280° C. This pigment can be used to color thin PE films with no inhomogeneities. Filter value: 0.3 bar/g.

EXAMPLE 14

30 parts of crude, coarsely crystalline perylene pigment (C.I. Pigment Red 149, C.I. No. 71137, prepared according to U.S. Pat. No. 2,905,685 and 1.5 parts of polyolefin wax (m.p.: 104° C., molecular mass about 2000) are placed in a steel container which is filled to 80% of its volume with 1400 parts of steatite balls having a diameter of 12 mm as grinding media, and milling is: carried out for 8 hours on a vibrating mill (Vibratom model, manufacturer: Siebtechnik, Mühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 5 minutes. The millbase suspension is then screened to remove the grinding media, which are washed with water, the combined millbase suspensions are filtered with suction and the solid product is washed with water and dried at 80° C. 14.4 parts are obtained of a pigment which is very readily dispersible in the plastic (PVC) and gives transparent colorations of birth color strength with unblemished bleed fastness.

EXAMPLE 15

30 parts of crude, coarsely crystalline perylene pigment (C.I. Pigment Red 149, C.I. No. 71137, prepared according to U.S. Pat No. 2,905,685 and 1.5 parts of ester wax (reaction product of montanic acid and glycerol, m.p.: 86.9° C. ) are placed in a steel container which is filled to 80% of its volume with 1400 parts of steatite balls having a diameter of 12 mm as grinding media, and milling is carried out for 8 hours on a vibrating mill (Vibratom model, manufacturer: Siebtechnik, Mühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction and the solid product is washed with water and dried at 80° C. 14.7 parts are obtained of a pigment which is very readily dispersible in the plastic (PVC) and gives transparent colorations of high color strength with unblemished bleed fastness.

EXAMPLE 16

3 0 parts of crude, coarsely crystalline perylene pigment (C.I. Pigment Red 149, C.I. No. 71137, prepared according to U.S. Pat. No. 2,905,685 and 1.5 parts of amide wax (reaction product of stearic acid and ethylenediamine, m.p.: 151.2° C.) are placed in a steel container which is filled to 80% of its volume with 1400 parts of steatite balls having a diameter of 12 mm as grinding media, and milling is carried out for 8 hours on a vibrating mill (Vibratom model, manufacturer: Siebtechnik, Mühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4mm as grinding media, and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction and the solid product is washed with water and dried at 80° C. 14.8 parts are obtained of a pigment which is very readily dispersible in the plastic (PVC) and gives transparent colorations of high color strength with unblemished bleed fastness.

EXAMPLE 17

0 parts of crude, coarsely crystalline perylene pigment (C.I. Pigment Red 149, C.I. No. 71137, prepared according to U.S. Pat. No. 2,905,685, 1.5 parts of polyolefin wax (m.p.: 104° C., molecular mass about 2000), 0.4 part of stearylamine and 0.75 part of perylene-3,4,9,10-tetracarboxylic acid N,N'-bis-2-sulfoethylimide are placed in a steel container which is filled to 80% of its volume with 1400 parts of steatite balls having a diameter of 12 mm as grinding media, and milling is carried out for 12 hours on a vibrating mill (Vibratom model, manufacturer: Siebtechnik, M ühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 1.5.6 m/s and a specific power density of 3.1 kW per liter of milling space at 25° C. for 15 minutes. The millbase suspension is then screened to remove the grinding media, which are washed with water, the combined millbase suspensions are filtered with suction and the solid product is washed with water and dried at 80° C. 14.9 parts are obtained of a pigment formulation which is very readily dispersible in the plastic (PVC) and gives transparent colorations of high color strength with unblemished bleed fastness. The temperature resistance is very good and is >300° C.

EXAMPLE 18

50 parts of crude, coarsely crystalline perylene pigment (C.I. Pigment Red 149, C.I. No. 71137, prepared according to U.S. Pat. No. 2,905,685 and 2.5 parts of polyolefin wax (m.p.: 104° C., molecular mass about 2000) are placed in a steel container which is filled to 80% of its volume with 1400 parts of steatite balls having a diameter of 12 mm as grinding media, and milling is carried out for 8 hours on a vibrating mill (Vibratom model, manufacturer: Siebtechnik, Mühlheim) at 1400 revolutions per minute with a vibration circle of 4 mm. The millbase is then screened to remove the grinding media.

A suspension consisting of 85 parts of water and 15 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction and the solid product is washed with water and dried at 80° C. 14.7 parts are obtained of a pigment which is very readily dispersible in the plastic (PVC) and gives transparent colorations of high color strength with unblemished bleed fastness.

EXAMPLE 19

30 parts of crude, coarsely crystalline pigment (C.I. Pigment Violet 23, C.I. No. 51319, prepared according to BIOS Final Report 960, with 25% salt from the synthesis) and 1.2 parts of surface-active agent (reaction product of 1 mol of triethanol amine and 3 mol of oleyl chloride) are placed in a plastic container which is filled to 80% of its volume with 1400 parts: of steatite cylinders having a diameter of 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 mm. The millbase is then screened to remove the grinding media.

A suspension consisting of 90 parts of water and 10 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4mm as grinding media., and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction and the solid product is washed with water and dried at 80° C. 9.8 parts are obtained of a pigment which gives transparent coatings of high color strength in the AM lacquer.

EXAMPLE 20

30 parts of crude, coarsely crystalline pigment (C.I. Pigment Violet 23, C.I. No. 51319, prepared as a crude, coarsely crystalline pigment according to BIOS Final Report 960, page 75; with 25% salt from the synthesis) and 1.1 parts of surface-active agent (fatty acid polyglycol ether, based on coconut fatty alcohol, predominantly $C_{12}$–$C_{14}$ alcohol, saturated, with 10 mol of ethylene oxide) are placed in a plastic container which is filled to 80% of its volume with 1400 parts of steatite cylinders having a diameter off 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 mm. The millbase is then screened to remove the grinding media.

A suspension consisting of 90 parts of water and 10 parts of the prepigment obtained from the vibration milling is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction and the solid product is washed with water and dried at 80° C. 9.8 parts are obtained of a pigment which gives transparent coatings of high color strength in the AM lacquer.

EXAMPLE 21

30 parts of crude, coarsely crystalline pigment (C.I. Pigment Violet 23, C.I. No. 51319, prepared as a crude, coarsely crystalline pigment according to BIOS Final Report 960, page 75; with 25% salt from the synthesis) are placed in a plastic container which is filled to 80% of its volume with 1400 parts of steatite cylinders having a diameter of 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 mm. The millbase is then screened to remove the grinding media.

A suspension consisting of 90 parts of water, 13.3 parts of the prepigment obtained from the vibration milling and 1 part of 2-ethylhexanoic acid is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction and the solid product is washed with water and dried at 80° C. 10.8 parts are obtained of a pigment which gives transparent coatings of high color strength in the AM lacquer. The rheology is assessed as 1–2. The viscosity is 6.4 s and the gloss measurement gives a value of 41. Transparent coatings of high color strength are obtained in the HSS lacquer. The rheology is assessed as 3. The viscosity is 9.3 s and the gloss measurement gives a value of 50.

EXAMPLE 22

30 parts of crude, coarsely crystalline pigment (C.I. Pigment Violet 23, C.I. No. 51319, prepared as a crude, coarsely crystalline pigment according to BIOS Final Report 960, page 75; with 25% salt from the synthesis) are placed in a plastic container which is filled to 80% of its volume with 1400 parts of steatite cylinders having a diameter of 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 mm. The millbase is then screened to remove the grinding media.

A suspension consisting of 90 parts of water, 13.6 parts of the prepigment obtained from the vibration milling and 1 part of surface-active agent (reaction product of coconut fatty acid polyethylene glycol ester, polyglycol dicarboxylic acid and dihydroabietylamine) is metered into a stirred ball mill (manufactured by Draiswerke GmbH, Mannheim) which is filled with 336 parts of zirconium mixed-oxide beads having a diameter of from 0.3 to 0.4 mm as grinding media, and the charge is milled at a peripheral stirrer speed of 15.6 m/s and a specific power density of 3.1 kW per liter of milling space at 25° C. for 15 minutes. The millbase suspension is then screened to remove the grinding media, which are washed with water, the combined millbase suspensions are filtered with suction and the solid product is washed with water and dried at 80° C. 9.8 parts are obtained of a pigment which is readily dispersible in the plastic (PVC) and gives colorations of high color strength.

EXAMPLE 22a (comparison example)

30 parts of crude, coarsely crystalline pigment (C.I. Pigment Violet 23, C.I. No. 51319, prepared as a crude, coarsely crystalline pigment according to BIOS Final Report 960, page 75; with 25% salt from the synthesis) are placed in a plastic container which is filled to 80% of its volume with 1400 parts of steatite cylinders having a diameter of 12 mm and a length of 12 mm as grinding media. Fine milling is carried out for 4 hours with agitation on a vibrating mill (Vibratom model; manufacturer: Siebtechnik Mühlheim) at 1400 revolutions per minute with a vibration circle of 4 mm. The millbase is then screened to remove the grinding media. This milling is repeated once.

A suspension consisting of 360 parts of water, 54 parts of the prepigment obtained from the vibration milling and 4 parts of surface-active agent (reaction product of coconut fatty acid polyethylene glycol ester, polyglycol dicarboxylic acid and dihydroabetylamine) is metered into a stirred ball mill with disc stirrer mechanism (manufactured by Draiswerke GmbH, Mannheim) which is filled with 1160 parts of quartz beads having a diameter of 1 mm as grinding media, and the charge is milled at a peripheral stirrer speed of 10.2 m/s and a specific power density of 0.45 kW per liter of milling space at 25° C. for 1 hour. The millbase suspension is then screened to remove the grinding media, which are washed with water, the combined millbase suspensions are filtered with suction, and the solid product is washed with water and dried at 80° C. 51.8 parts are obtained of a pigment whose color strength in the plastic (PVC) is markedly lower than that of the pigment prepared in accordance with Example 22.

I claim:

1. A process for the fine division of crude polycyclic organic pigments, which comprises first of all subjecting the crude, coarsely crystalline pigments to dry milling and wet-milling the resulting finely divided prepigments in aqueous suspension in a stirred ball mill which is operated at a power density of more than 2.5 kW per liter of milling space and a peripheral stirrer speed of more than 12 m/s under the action of grinding media having a diameter of less than or equal to 1 mm with the proviso that there is no inorganic salt present in the dry milling step.

2. The process as claimed in claim 1, wherein the dry milling is carried out with a millbase charge of less than 250 g of crude pigment per liter of free volume of the bed of grinding media.

3. The process as claimed in claim 1, wherein the dry milling is carried out with a millbase charge of from 50 to 150 g of crude pigment per liter of free volume of the bed of grinding media.

4. The process as claimed in claim 1, wherein the dry milling is carried out in a vibrating mill with a grinding charge of more than 60% by volume.

5. The process as claimed in claim 1, wherein the dry milling is carried out in the presence of a milling auxiliary in a quantity of from 0.1 to 10% by weight, based on the crude, coarsely crystalline pigment.

6. The process as claimed in claim 1, wherein the dry milling is carried out in the presence of a milling auxiliary in a quantity of from 2.5 to 7.5% by weight, based on the crude, coarsely crystalline pigment.

7. The process as claimed in claim 5, wherein the milling auxiliary is a wax, a surface-active agent or a mixture thereof.

8. The process as claimed in claim 7, wherein the surface-active agent is a fatty acid tauride, fatty acid N-methyltauride, fatty acid isethionate, alkylbenzenesulfonate, alkylnaphthalenesulfonate, alkylphenol polyglycol ether sulfate, fatty alcohol polyglycol ether sulfate, a fatty acid, resin acid, an alkali-soluble resin, a fatty amine ethoxylate, a fatty amine, a fatty alcohol polyglycol ether, a fatty acid polyglycol ester or an alkylphenol polyglycol ether.

9. The process as claimed in claim 7, wherein the wax is a polyolefin wax.

10. The process as claimed in claim 1, wherein the grinding media employed in wet milling have a diameter of from 0.2 to 0.8 mm.

11. The process as claimed in claim 1, wherein the grinding media employed in wet milling have a diameter of from 0.3 to 0.5 mm.

12. The process as claimed in claim 1, wherein the concentration of prepigment in the millbase of the wet milling stage is less than 40% by weight.

13. The process as claimed in claim 1, wherein the concentration of prepigment in the millbase of the wet milling stage is from 10 to 35% by weight.

14. A method of pigmenting paints, printing inks and plastics comprising the step of incorporating an organic polycyclic pigment prepared as claimed in claim 1 into said paints, printing inks and plastics.

15. The method as claimed in claim 14, wherein the plastic is a cellulose ether or cellulose ester, a natural resin, addition polymerization resin or condensation resin, alkyd resin, acrylic resin, phenolic resin, polycarbonate, polyolefin, polyvinyl chloride, polyacrylonitrile, polyacrylate, polyamide, polyurethane, polyester, rubber, casein, silicone or silicone resin, or a mixture thereof.

16. The method as claimed in claim 14, wherein the plastic is a plastic mass, melt or spinning solution.

17. A process for the fine division of crude, coarsely crystalline quinacridone, perylene or dioxazine pigments, which comprises first of all subjecting said crude pigments to dry milling and wet milling the resulting finely divided prepigments in aqueous suspension in a stirred ball mill which is operated at a power density of more than 2.5 kW per liter of milling space and a peripheral stirrer speed of more than 12 m/s under the action of grinding media having a diameter of less than or equal to 1 mm with the proviso that there is no inorganic salt present in the dry milling step.

18. The process as claimed in claim 1, wherein the dry milling is carried out in a rolling mill with a grinding charge of from 40 to 60% by volume.

* * * * *